United States Patent
Smyers et al.

(10) Patent No.: US 7,103,700 B2
(45) Date of Patent: *Sep. 5, 2006

(54) METHOD OF AND APPARATUS FOR CONTROLLING BIDIRECTIONAL STREAMS OF ISOCHRONOUS DATA FLOWING BETWEEN AN APPLICATION AND A BUS STRUCTURE

(75) Inventors: Scott D. Smyers, Los Gatos, CA (US); Bruce Fairman, Woodside, CA (US); Hisato Shima, Tokyo (JP)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 415 days.

This patent is subject to a terminal disclaimer.

(21) Appl. No.: 10/430,666

(22) Filed: May 5, 2003

(65) Prior Publication Data

US 2003/0217199 A1 Nov. 20, 2003

Related U.S. Application Data

(63) Continuation of application No. 09/878,304, filed on Jun. 11, 2001, now Pat. No. 6,587,910, which is a continuation of application No. 09/280,215, filed on Mar. 29, 1999, now Pat. No. 6,266,727, which is a continuation of application No. 08/612,322, filed on Mar. 7, 1996, now Pat. No. 6,233,637.

(51) Int. Cl.
*G06F 13/00* (2006.01)

(52) U.S. Cl. .................. 710/305; 710/313; 710/315; 710/65

(58) Field of Classification Search ........ 710/305–315, 710/4–7, 36–43, 29, 31, 65, 105
See application file for complete search history.

(56) References Cited

U.S. PATENT DOCUMENTS 3,836,722 A 9/1974 Mueller et al. ......... 179/15 BS (Continued)

FOREIGN PATENT DOCUMENTS

EP 0 267 974 11/1986

(Continued)

OTHER PUBLICATIONS

US 5,475,760, 12/1995, Ellison et al. (withdrawn)
"1394 200 Mb/s PHYsical Layer Transceiver", IBM Microelectronics, Product Data Sheet and Application Notes, Version 1.4, Mar. 14, 1996, pp. 1–17.

(Continued)

*Primary Examiner*—Paul R. Myers
*Assistant Examiner*—Raymond N Phan
(74) *Attorney, Agent, or Firm*—Haverstock & Owens LLP

(57) ABSTRACT

An isochronous data pipe provides a bi-directional path for data between an application and a bus structure. The isochronous data pipe includes the ability to send, receive and perform manipulations on any isochronous stream of data, including data on any number of isochronous channels. The isochronous data pipe is a programmable sequencer that operates on the stream of isochronous data as it passes through the isochronous data pipe. The isochronous data pipe is programmed by an application to perform specific operations on the stream of data before the data is either transmitted across the bus structure or sent to the application, thereby pre-processing and manipulating the data before it is delivered to its destination. The operations are performed on both the packet header and the data field of the data packet. The isochronous data pipe can be stopped and started on the occurrence of specific events. In an alternate embodiment of the present invention, the isochronous data pipe is programmed to send and receive both isochronous and asynchronous data, including generating requests and appropriate packet headers.

17 Claims, 5 Drawing Sheets

U.S. PATENT DOCUMENTS

| | | | |
|---|---|---|---|
| 3,889,236 A | 6/1975 | Herger et al. ............ 340/172.5 |
| 3,906,484 A | 9/1975 | Melvin, Jr. et al. ... 340/347 DD |
| 4,218,756 A | 8/1980 | Fraser ........................ 364/900 |
| 4,379,294 A | 4/1983 | Sutherland et al. ...... 340/825.5 |
| 4,395,710 A | 7/1983 | Einolf, Jr. et al. ....... 340/825.5 |
| 4,409,656 A | 10/1983 | Andersen et al. ........... 364/200 |
| 4,493,021 A | 1/1985 | Agrawal et al. ............. 364/200 |
| 4,633,392 A | 12/1986 | Vincent et al. .............. 364/200 |
| 4,641,307 A | 2/1987 | Russell ......................... 370/60 |
| 4,739,323 A | 4/1988 | Miesterfeld et al. ...... 340/825.5 |
| 4,750,149 A | 6/1988 | Miller ......................... 364/900 |
| 4,857,910 A | 8/1989 | Baunach ..................... 340/799 |
| 4,897,783 A | 1/1990 | Nay ............................. 364/200 |
| 4,972,470 A | 11/1990 | Farago ........................... 380/3 |
| 4,998,245 A | 3/1991 | Tanaka et al. .............. 370/85.1 |
| 5,008,879 A | 4/1991 | Fischer et al. .............. 370/85.2 |
| 5,117,070 A | 5/1992 | Ueno et al. .................. 178/2 R |
| 5,191,418 A | 3/1993 | Tran ........................... 358/142 |
| 5,276,684 A | 1/1994 | Pearson .................... 370/94.1 |
| 5,301,287 A | 4/1994 | Herrell et al. ............... 395/400 |
| 5,307,491 A | 4/1994 | Feriozi et al. ............... 395/700 |
| 5,325,510 A | 6/1994 | Frazier ....................... 395/425 |
| 5,343,469 A | 8/1994 | Ohshima .................... 370/85.1 |
| 5,359,713 A | 10/1994 | Moran et al. ................ 395/200 |
| 5,361,261 A | 11/1994 | Edem et al. ................ 370/85.3 |
| 5,369,773 A | 11/1994 | Hammerstrom ............. 395/800 |
| 5,400,340 A | 3/1995 | Hillman et al. .......... 370/105.3 |
| 5,402,419 A | 3/1995 | Osakabe et al. ............ 370/85.1 |
| 5,412,698 A | 5/1995 | Van Brunt et al. .......... 375/373 |
| 5,420,573 A | 5/1995 | Tanaka et al. .......... 340/825.24 |
| 5,444,709 A | 8/1995 | Riddle ........................ 370/94.1 |
| 5,465,402 A | 11/1995 | Ono et al. ................. 455/161.2 |
| 5,475,860 A | 12/1995 | Ellison et al. ............... 395/846 |
| 5,487,153 A | 1/1996 | Hammerstrom et al. .... 395/250 |
| 5,493,570 A | 2/1996 | Hillman et al. .......... 370/105.3 |
| 5,497,466 A | 3/1996 | Roden et al. ................ 395/306 |
| 5,499,344 A | 3/1996 | Elnashar et al. ............ 395/250 |
| 5,500,946 A | 3/1996 | Roden et al. ................ 395/308 |
| 5,504,757 A | 4/1996 | Cook et al. .................... 370/84 |
| 5,506,846 A | 4/1996 | Edem et al. ................ 370/94.2 |
| 5,509,126 A | 4/1996 | Oprescu et al. ............. 395/307 |
| 5,515,329 A | 5/1996 | Dalton et al. ................ 365/221 |
| 5,517,662 A | 5/1996 | Coleman et al. ............ 395/800 |
| 5,519,701 A | 5/1996 | Colmant et al. ............ 370/60.1 |
| 5,524,213 A | 6/1996 | Dais et al. .............. 395/200.17 |
| 5,526,353 A | 6/1996 | Henley et al. ............. 370/60.1 |
| 5,533,018 A | 7/1996 | DeJager et al. ............ 370/60.1 |
| 5,535,208 A | 7/1996 | Kawakami et al. ........... 370/84 |
| 5,537,408 A | 7/1996 | Branstad et al. .............. 370/79 |
| 5,537,601 A | 7/1996 | Kimura et al. .............. 395/800 |
| 5,544,324 A | 8/1996 | Edem et al. ............ 395/200.17 |
| 5,546,389 A | 8/1996 | Wippenbeck et al. ........ 370/60 |
| 5,546,553 A | 8/1996 | Robertson et al. ........... 395/405 |
| 5,548,587 A | 8/1996 | Bailey et al. ............... 370/60.1 |
| 5,550,802 A | 8/1996 | Worsley et al. ............... 370/13 |
| 5,559,796 A | 9/1996 | Edem et al. ................... 370/60 |
| 5,559,967 A | 9/1996 | Oprescu et al. ............. 395/285 |
| 5,566,174 A | 10/1996 | Sato et al. ..................... 370/84 |
| 5,586,264 A | 12/1996 | Belknap et al. ........ 395/200.08 |
| 5,594,732 A | 1/1997 | Bell et al. ................... 370/401 |
| 5,594,734 A | 1/1997 | Worsley et al. ............. 370/395 |
| 5,602,853 A | 2/1997 | Ben-Michael et al. ...... 370/474 |
| 5,603,058 A | 2/1997 | Belknap et al. ............. 395/855 |
| 5,615,382 A | 3/1997 | Gavin et al. ................ 395/800 |
| 5,617,419 A | 4/1997 | Christensen et al. ........ 370/471 |
| 5,619,646 A | 4/1997 | Hoch et al. ............. 395/200.01 |
| 5,632,016 A | 5/1997 | Hoch et al. ............. 395/200.02 |
| 5,640,392 A | 6/1997 | Hayashi ...................... 370/395 |
| 5,640,592 A | 6/1997 | Rao ............................... 710/5 |
| 5,646,941 A | 7/1997 | Nishimura et al. ......... 370/389 |
| 5,647,057 A | 7/1997 | Roden et al. ................ 395/275 |
| 5,652,584 A | 7/1997 | Yoon ............................. 341/89 |
| 5,655,138 A | 8/1997 | Kikinis ....................... 395/808 |
| 5,659,780 A | 8/1997 | Wu ........................ 395/800.19 |
| 5,664,124 A | 9/1997 | Katz et al. ................... 395/309 |
| 5,668,948 A | 9/1997 | Belknap et al. ......... 395/200.61 |
| 5,682,493 A * | 10/1997 | Yung et al. .................. 712/217 |
| 5,684,954 A | 11/1997 | Kaiserswerth et al. ... 395/200.2 |
| 5,687,174 A | 11/1997 | Edem et al. ................. 370/446 |
| 5,687,316 A | 11/1997 | Graziano et al. ......... 395/200.2 |
| 5,689,244 A | 11/1997 | Iijima et al. ............ 340/825.07 |
| 5,692,211 A | 11/1997 | Gulick et al. ............... 395/800 |
| 5,694,555 A | 12/1997 | Morriss et al. .............. 395/280 |
| 5,696,924 A | 12/1997 | Robertson et al. .......... 395/412 |
| 5,701,302 A * | 12/1997 | Geiger ........................ 370/521 |
| 5,704,052 A | 12/1997 | Wu et al. .................... 395/380 |
| 5,706,439 A | 1/1998 | Parker .................... 395/200.17 |
| 5,708,779 A | 1/1998 | Graziano et al. ......... 395/200.8 |
| 5,710,773 A | 1/1998 | Shiga .......................... 370/512 |
| 5,752,076 A * | 5/1998 | Munson .......................... 710/5 |
| 5,758,075 A | 5/1998 | Graziano et al. ......... 395/200.8 |
| 5,761,430 A | 6/1998 | Gross et al. ............ 395/200.55 |
| 5,761,457 A | 6/1998 | Gulick ........................ 395/308 |
| 5,774,683 A | 6/1998 | Gulick ........................ 395/309 |
| 5,781,599 A | 7/1998 | Shiga .......................... 375/376 |
| 5,787,256 A | 7/1998 | Marik et al. ............ 395/200.68 |
| 5,787,298 A | 7/1998 | Broedner et al. ....... 395/750.05 |
| 5,793,953 A | 8/1998 | Yeung et al. ............. 395/200.8 |
| 5,799,041 A | 8/1998 | Szkopek et al. ............ 375/259 |
| 5,812,883 A | 9/1998 | Rao ........................... 395/8.94 |
| 5,815,678 A | 9/1998 | Hoffman et al. ............ 395/309 |
| 5,826,041 A | 10/1998 | Ogus ........................... 395/250 |
| 5,828,416 A | 10/1998 | Ryan ........................... 348/512 |
| 5,828,903 A | 10/1998 | Sethuram et al. ........... 395/817 |
| 5,832,245 A | 11/1998 | Gulick ........................ 395/309 |
| 5,835,726 A | 11/1998 | Shwed et al. ............... 709/229 |
| 5,835,793 A | 11/1998 | Li et al. ...................... 395/898 |
| 5,848,253 A | 12/1998 | Walsh et al. ................ 395/309 |
| 5,872,983 A | 2/1999 | Walsh et al. ........... 395/750.01 |
| 5,875,312 A | 2/1999 | Walsh et al. ................ 395/309 |
| 5,884,103 A | 3/1999 | Terho et al. .................. 710/72 |
| 5,887,145 A | 3/1999 | Harari et al. ................ 395/282 |
| 5,938,752 A | 8/1999 | Leung et al. ................ 710/126 |
| 5,946,298 A | 8/1999 | Okuyama .................... 370/232 |
| 5,948,053 A | 9/1999 | Kamiya ....................... 708/522 |
| 5,970,236 A | 10/1999 | Galloway et al. ....... 395/500.44 |
| 5,987,126 A | 11/1999 | Okuyama et al. .............. 380/5 |
| 5,991,520 A | 11/1999 | Smyers et al. .............. 395/280 |
| 6,029,221 A | 2/2000 | Wu et al. .................... 710/129 |
| 6,085,270 A | 7/2000 | Gulick ........................ 710/100 |
| 6,145,016 A | 11/2000 | Lai et al. ........................ 710/4 |
| 6,205,538 B1 * | 3/2001 | Yung .......................... 712/201 |
| 6,226,338 B1 | 5/2001 | Earnest ....................... 375/372 |
| 6,233,637 B1 * | 5/2001 | Smyers et al. .............. 710/311 |
| 6,243,783 B1 | 6/2001 | Smyers et al. .............. 710/129 |
| 6,266,727 B1 | 7/2001 | Smyers et al. .............. 710/105 |
| 6,516,371 B1 | 2/2003 | Lai et al. .................... 710/129 |
| 6,519,268 B1 | 2/2003 | Smyers ....................... 370/536 |
| 6,584,099 B1 | 6/2003 | Sato et al. ................... 370/362 |
| 6,587,910 B1 | 7/2003 | Smyers et al. .............. 710/306 |
| 6,631,435 B1 | 10/2003 | Lym et al. .................. 710/305 |
| 6,732,223 B1 | 5/2004 | Johnson ...................... 711/105 |

FOREIGN PATENT DOCUMENTS

| | | |
|---|---|---|
| EP | 0267 974 A1 | 5/1988 |
| EP | 0428 111 A2 | 5/1991 |
| EP | 0 499 394 A1 | 8/1992 |
| EP | 0 578 013 A1 | 1/1994 |
| EP | 0 588 046 A1 | 3/1994 |
| EP | 0 651 329 A2 | 10/1994 |
| EP | 0 696 853 A2 | 2/1996 |

| | | |
|---|---|---|
| GB | 2 275 852 A | 7/1994 |
| JP | 63-129449 | 6/1988 |
| JP | 4-318649 | 11/1992 |
| JP | 6-161932 | 6/1994 |
| JP | 6-326968 | 11/1994 |
| JP | 7-182260 | 7/1995 |
| JP | 7-222263 | 8/1995 |

OTHER PUBLICATIONS

"IEEE 1394–1995 Triple Cable Transceiver/Arbiter", TSB21LV04, Texas Instruments, Product Review, Revision 0.99, Mar. 19, 1996.

"P1394 Standard for a High Performance Serial Bus", IEEE Standards Department, 1995, pp. 1–384.

R. H. J. Bloks, "The IEEE–1394 High Speed Serial Bus", Philips J. Res. 50, 1996, pp. 209–216.

Matthias Kaiserswerth, "The Parallel Protocol Engine", IEEE/ACM Transactions on Networking, vol. 6, Dec. 1993, New York, pp. 650–663.

A.S. Krishnakumar et al., "The Programmable Protocol VLSI Engine (PROVE)" IEEE Transaction on Communication, Aug. 1994, New York, pp. 2630–2642.

Michael Teener, "A Bus on a Diet—The Serial Bus Alternative", CompCon92, Feb. 24–28, 1992, pp. 316–321.

"Local Area Network Protocol for Autonomous Control of Attached Devices", Software Patent Institute of Software Technologies, Record Display, Jul. 1990.

"Architecture for High Performance Transparent Bridges", Software Patent Institute of Software Technologies, Record Display, Jul. 1992.

"Access to High–Speed LAN via Wireless Media", Software Patent Institute Database of Software Technologies, Record Display, Apr. 1993.

Julia L. Hecter, "Asynchronous Transfer Mode", Dec. 12, 1995, pp. 1–11.

"The SerialSoft IEEE 1304 Developer Toolkit", Skipstone, Toolkit TK–01, Release 2, pp. 1–158.

Gee–Swee Poo et al., "Data Link Driver Program Design for the IBM Token Ring Network PC Adapter", Computer Communications, No. 5, Oct. 1999, London, pp. 266–272.

A. Anzaloni et al., "Fiber Channel(FCS)/ATM Interworking: A design Solution", Ericsson Fatme R & D Division, Rome, I, Nov. 1993.

"Data Exchange Adapter for Micro Channel/37", Software Patent Institute Database of Software Technologies, Record Display, Oct. 1991.

Michael Tischer, "PC 4 Interm Systemprogrammierung", Data Becker GmbH, Germany, pp. 162–181, 1994.

Daniel Moore, "IEEE 1394, The Cable Connection to Complete The Digital Revolution", Skipstone, Inc., pp. 1–7.

* cited by examiner-

| OFFSET | R/W | FUNCTION | | | |
|---|---|---|---|---|---|
| | | BYTE 0 (msb) | BYTE 1 | BYTE 2 | BYTE 3 (lsb) |
| 0 | RW | CYCLE TIME (20 BITS) | | | |
| 4 | RW | CONTROL | | | |
| 8 | RW | STATUS | | | |
| C | | | | | |
| 10 | | | | | |
| 14 | | | | | |
| 18 | | | | | |
| 1C | | | | | |
| 20 | RW | pending_ch_mask_hi | | | |
| 24 | RW | pending_ch_mask_lo | | | |
| 28 | RO | ch_mask_hi | | | |
| 2C | RO | ch_mask_lo | | | |
| 30 | | | | | |
| 34 | RW | CS_output | | | CS_addr_CS |
| 38 | RW | CS_addr_0 | | | |
| 3C | RW | | | | |
| 40 | RW | | | | |
| 44 | RW | | | | |
| 48 | RW | | | | |
| 4C | RW | | | | |
| 50 | RW | | | | |
| 54 | RW | | | | |
| 58 | RW | | | | |
| 5C | RW | | | | |
| 60 | RW | | | | |
| 64 | RW | | | | |
| 68 | RW | | | | |
| 6C | RW | | | | |
| 70 | RW | | | | |
| 74 | RW | | | | CS_addr_63 |

*IDP Register File*

FIG. 3

| NAME | REG CODE | WIDTH | SRC/DEST? | REGISTER USAGE |
|---|---|---|---|---|
| TMM | 0 | 34 | SRC | IMMEDIATE VALUE |
| BUS_IN | 1 | 32 | SRC | RECEIVE FIFO |
| BUS_OUT | 2 | 34 | DEST | OUTBOUND ISOCHRONOUS FIFO |
|  | 3 |  |  |  |
| D0 | 4 | 34 | SRC/DEST | DATA REGISTER 0 |
| D1 | 5 | 34 | SRC/DEST | DATA REGISTER 1 |
| D2 | 6 | 34 | SRC/DEST | DATA REGISTER 2 |
| D3 | 7 | 34 | SRC/DEST | DATA REGISTER 3 |
| D4 | 8 | 34 | SRC/DEST | DATA REGISTER 4 |
| D5 | 9 | 34 | SRC/DEST | DATA REGISTER 5 |
| D6 | A | 34 | SRC/DEST | DATA REGISTER 6 |
| D7 | B | 34 | SRC/DEST | DATA REGISTER 7 |
|  | C |  |  |  |
|  | D |  |  |  |
|  | E |  |  |  |
|  | F |  |  |  |
| DATA_0 | 10 | 32 | SRC/DEST | DATA INTERFACE DMA CHANNEL 0 |
| DATA_1 | 11 | 32 | SRC/DEST | DATA INTERFACE DMA CHANNEL 1 |
| DATA_2 | 12 | 32 | SRC/DEST | DATA INTERFACE DMA CHANNEL 2 |
| DATA_3 | 13 | 32 | SRC/DEST | DATA INTERFACE DMA CHANNEL 3 |
|  | 14 |  |  |  |
|  | 15 |  |  |  |
|  | 16 |  |  |  |
|  | 17 |  |  |  |
|  | 18 |  |  |  |
|  | 19 |  |  |  |
|  | 1A |  |  |  |
|  | 1B |  |  |  |
|  | 1C |  |  |  |
|  | 1D |  |  |  |
|  | 1E |  |  |  |
|  | 1F |  |  |  |

FIG. 4

| OFFSET | DATA | | | | | |
|---|---|---|---|---|---|---|
| 0 | seconds | cycle_number N | 0000 | cycle | 0000 | |
| 4 | data_length | tg | ch A | data | sy | |
| | data_length bytes | | | | | |
| | data_length | tg | ch B | data | sy | |
| | data_length bytes | | | | | |
| | seconds | cycle_number N+1 | 0000 | cycle | 0000 | |
| | data_length | tg | ch A | data | sy | |
| | data_length bytes | | | | | |
| | data_length | tg | ch B | data | sy | |
| | data_length bytes | | | | | |
| | seconds | cycle_number N+2 | 0000 | cycle | 0000 | |
| | data_length | tg | ch A | data | sy | |
| | data_length bytes | | | | | |

*FIG. 5*

METHOD OF AND APPARATUS FOR
CONTROLLING BIDIRECTIONAL STREAMS
OF ISOCHRONOUS DATA FLOWING
BETWEEN AN APPLICATION AND A BUS
STRUCTURE

This application is a continuation of U.S. patent application Ser. No. 09/878,304 filed Jun. 11, 2001, now U.S. Pat. No. 6,587,910 which is a continuation of U.S. patent application Ser. No. 09/280,215 filed on Mar. 29, 1999, now issued as U.S. Pat. No. 6,266,727, which is a continuation of U.S. patent application Ser. No. 08/612,322 filed on Mar. 07, 1996, now issued as U.S. Pat. No. 6,233,637.

FIELD OF THE INVENTION

The present invention relates to the field of conducting isochronous data transfer operations to and from an application over a bus structure. More particularly, the present invention relates to the field of managing and manipulating a high-speed stream of isochronous data to complete a data transfer operation between an application and node coupled to a bus structure.

BACKGROUND OF THE INVENTION

The IEEE 1394 standard, "P1394 Standard For A High Performance Serial Bus," Draft 8.01 vl, Jun. 16, 1995, is an international standard for implementing an inexpensive high-speed serial bus architecture which supports both asynchronous and isochronous format data transfers. Isochronous data transfers are real-time transfers which take place such that the time intervals between significant instances have the same duration at both the transmitting and receiving applications. Each packet of data transferred isochronously is transferred in its own time period. An example of an ideal application for the transfer of data isochronously would be from a video recorder to a television set. The video recorder records images and sounds and saves the data in discrete chunks or packets. The video recorder then transfers each packet, representing the image and sound recorded over a limited time period, during that time period, for display by the television set. The IEEE 1394 standard bus architecture provides multiple channels for isochronous data transfer between applications. A six bit channel number is broadcast with the data to ensure reception by the appropriate application. This allows multiple applications to simultaneously transmit isochronous data across the bus structure. Asynchronous transfers are traditional data transfer operations which take place as soon as possible and transfer an amount of data from a source to a destination.

The IEEE 1394 standard provides a high-speed serial bus for interconnecting digital devices thereby providing a universal I/O connection. The IEEE 1394 standard defines a digital interface for the applications thereby eliminating the need for an application to convert digital data to analog data before it is transmitted across the bus. Correspondingly, a receiving application will receive digital data from the bus, not analog data, and will therefore not be required to convert analog data to digital data. The cable required by the IEEE 1394 standard is very thin in size compared to other bulkier cables used to connect such devices. Devices can be added and removed from an IEEE 1394 bus while the bus is active. If a device is so added or removed the bus will then automatically reconfigure itself for transmitting data between the then existing nodes. A node is considered a logical entity with a unique address on the bus structure. Each node provides an identification ROM, a standardized set of control registers and its own address space.

The IEEE 1394 standard defines a protocol as illustrated in FIG. 1. This protocol includes a serial bus management block 10 coupled to a transaction layer 12, a link layer 14 and a physical layer 16. The physical layer 16 provides the electrical and mechanical connection between a device or application and the IEEE 1394 cable. The physical layer 16 also provides arbitration to ensure that all devices coupled to the IEEE 1394 bus have access to the bus as well as actual data transmission and reception. The link layer 14 provides data packet delivery service for both asynchronous and isochronous data packet transport. This supports both asynchronous data transport, using an acknowledgement protocol, and isochronous data transport, providing real-time guaranteed bandwidth protocol for just-in-time data delivery. The transaction layer 12 supports the commands necessary to complete asynchronous data transfers, including read, write and lock. The serial bus management block 10 contains an isochronous resource manager for managing isochronous data transfers. The serial bus management block 10 also provides overall configuration control of the serial bus in the form of optimizing arbitration timing, guarantee of adequate electrical power for all devices on the bus, assignment of the cycle master, assignment of isochronous channel and bandwidth resources and basic notification of errors.

To initialize an isochronous transfer, several asynchronous data transfers may be required to configure the applications and to determine the specific channel which will be used for transmission of the data. Once the channel has been determined, buffers are used at the transmitting application to store the data before it is sent and at the receiving application to store the data before it is processed. In a general purpose host or peripheral implementation, the format of the transmitted data is not in a form which can be used by the application. In most cases, a general purpose processor must preprocess the stream of data before sending it to the application. Often, the preprocessing task consumes considerable computational power which can make it impossible to effectively handle the real time stream of data.

What is needed is an isochronous data pipe that provides the ability to the application to manage and manipulate a high-speed stream of data being sent from or received by the application over a bus structure. What is further needed is an isochronous data pipe which allows the application to transmit and receive data in its native format, thereby improving the ability of the application to effectively handle a continuous stream of data over time.

SUMMARY OF THE INVENTION

An isochronous data pipe provides a bi-directional path for data between an application and a bus structure. The isochronous data pipe includes the ability to send, receive and perform manipulations on any isochronous stream of data, including data on any number of isochronous channels. The isochronous data pipe is a programmable sequencer that operates on the stream of isochronous data as it passes through the isochronous data pipe. The isochronous data pipe is programmed by an application to perform specific operations on the stream of data before the data is either transmitted across the bus structure or sent to the application, thereby pre-processing and manipulating the data before it is delivered to its destination. The operations are performed on both the packet header and the data field of the data packet. The isochronous data pipe can be stopped and started on the occurrence of specific events. In an alternate embodiment of the present invention, the isochronous data pipe is programmed to send and receive both isochronous and asynchronous data, including generating requests and appropriate packet headers.

BRIEF DESCRIPTION OF THE DRAWINGS

FIG. 3 illustrates a register file within the isochronous data pipe.

FIG. 4 illustrates a register file within the isochronous data pipe sequencer.

FIG. 5 illustrates an example of an isochronous data stream showing the isochronous recording format.

DETAILED DESCRIPTION OF THE PREFERRED EMBODIMENT

An isochronous data pipe transmits and receives data for an application across a bus structure. Preferably, the bus structure is an IEEE 1394 standard bus structure. The isochronous data pipe is programmable and will execute a series of instructions on a stream of data in order to perform manipulations on the data required by the application. In a link circuit, an isochronous data pipe is included for transmitting and receiving isochronous data and an asynchronous data pipe is included for transmitting and receiving asynchronous data. The data from the isochronous data pipe and the asynchronous data pipe is multiplexed onto the bus structure. The data received from the bus structure is demultiplexed to the isochronous data pipe and the asynchronous data pipe. Alternatively, the isochronous data pipe is programmed to transmit and receive both isochronous and asynchronous data.

Figure 1:
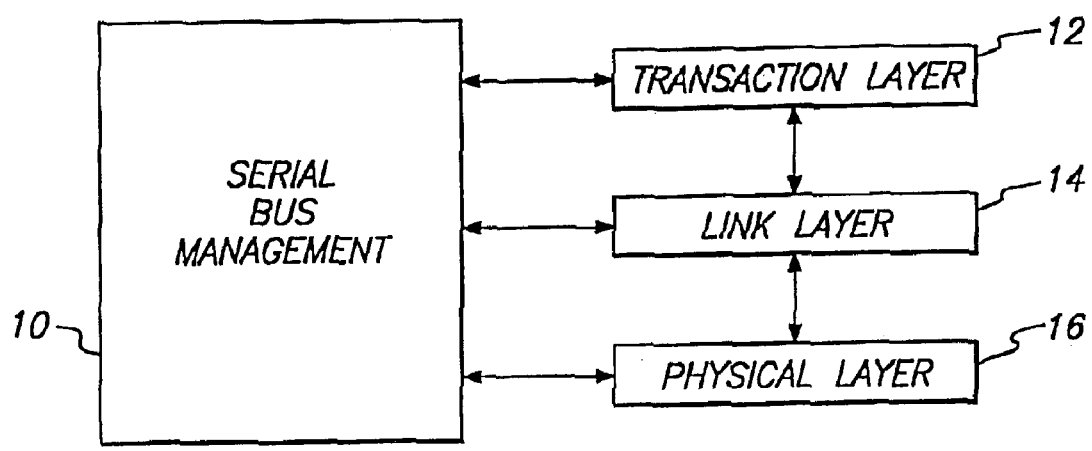
FIG. 1 illustrates a protocol defined by the IEEE 1394 standard.
Figure 2:
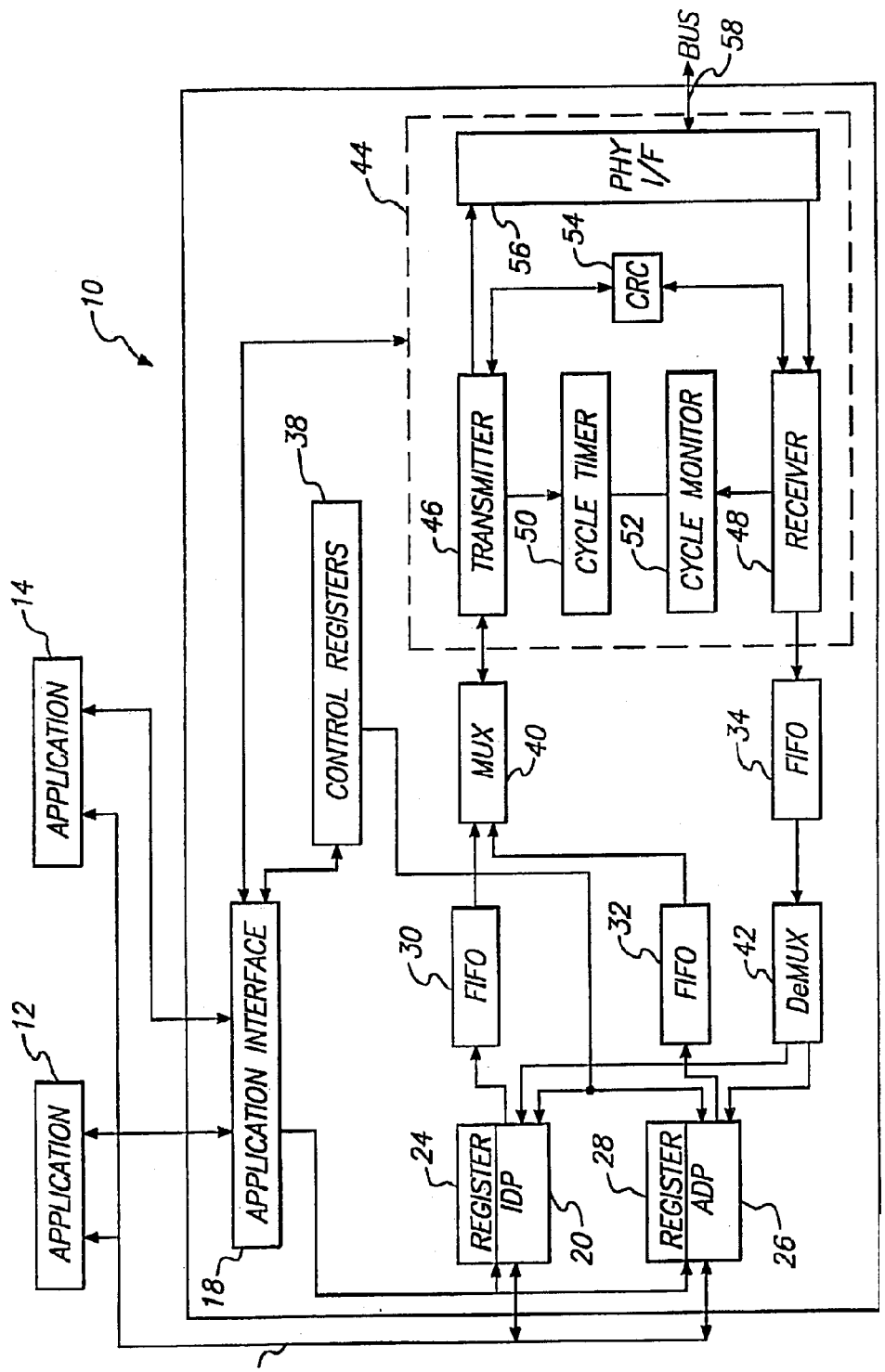
FIG. 2 illustrates a block diagram schematic of a link circuit including an isochronous data pipe according to the present invention and an asynchronous data pipe.

A link circuit including an isochronous data pipe (IDP), according to the present invention, and an asynchronous data pipe is illustrated in FIG. 2. The link circuit 10 provides a link between applications 12 and 14 and a bus structure 58. The applications 12 and 14 are both coupled to a system bus 16. The system bus 16 is coupled to both the isochronous data pipe 20 and the asynchronous data pipe 26. The applications 12 and 14 are also both coupled to an applications interface circuit 18. The applications interface circuit 18 is coupled to a set of control registers 38, to the isochronous data pipe 20, to the asynchronous data pipe 26 and to a link core 44. Both the isochronous data pipe and the asynchronous data pipe 26 include a register set 24 and 28, respectively. The outbound FIFO 30 corresponds to the isochronous data pipe 20 and is coupled between the isochronous data pipe 20 and a multiplexer 40. The outbound FIFO 32 corresponds to the asynchronous data pipe 26 and is coupled between the asynchronous data pipe 26 and the multiplexer 40. The control registers 38 are also coupled to both the isochronous data pipe 20 and the asynchronous data pipe 26. An inbound FIFO 34 is coupled to a demultiplexer 42. The demultiplexer 42 is coupled to both the isochronous data pipe 20 and the asynchronous data pipe 26.

The link core 44 includes a transmitter 46, a receiver 48, a cycle timer 50, a cycle monitor 52, a CRC error checking circuit 54 and a physical interface circuit 56 for physically interfacing to the bus structure 58. The transmitter 46 is coupled to the multiplexer 40, to the cycle timer 50, to the CRC error checking circuit 54 and to the physical interface circuit 56. The receiver 48 is coupled to the inbound FIFO 34, to the cycle monitor 52, to the CRC error checking circuit 54 and to the physical interface circuit 56. The cycle timer 50 is coupled to the cycle monitor 52. The physical interface circuit 56 is coupled to the bus structure 58.

The link circuit 10, illustrated in FIG. 2, includes a single FIFO 34 for all incoming data, both isochronous and asynchronous, a FIFO 30, dedicated to the isochronous data pipe 20 for outbound data and a FIFO 32, dedicated to the asynchronous data pipe 26 for outbound data. The outbound data from the FIFOs 30 and 32 are multiplexed, by the multiplexer 40, through the link core 44 and onto the bus structure 58. The inbound data from the FIFO 34 is directed to either the isochronous data pipe 20 or the asynchronous data pipe 26, by the demultiplexer 42, as will be discussed below.

Preferably, the inbound FIFO 34 is thirty-three bits wide, the outbound FIFO 30 is thirty-four bits wide and the outbound FIFO 32 is thirty-three bits wide. In each of the FIFOs 30, 32 and 34, bits 0 through 31 are designated to carry data and bit 32 is designated to carry a packet boundary marker. For outbound packets, the isochronous data pipe 20 and the asynchronous data pipe 26 set the bit 32 to a logical high voltage level on the first quadlet of each packet. For inbound packets, the link core 44 sets the bit 32 to a logical high voltage level on the first quadlet of each packet.

In the outbound FIFO 30, corresponding to the isochronous data pipe 20, bit 33 is designated to indicate an isochronous cycle boundary. The isochronous data pipe 20 sets the bit 33 to a logical high voltage level on the first quadlet of the first isochronous packet in each isochronous cycle. When the link core 44 receives a quadlet of data with the bit 33 set to a logical high voltage level, it delays until the next cycle start, then transmits all isochronous packets in the outbound FIFO 30 until another quadlet with the bit 33 set to a logical high voltage level is detected.

To transmit application data, from one of the applications 12 and 14, onto the bus structure 58, the isochronous data pipe 20 and the asynchronous data pipe 26 both generate appropriate header information and append the appropriate application data to form a packet in the form required by the bus structure 58. These packets are then stored in the appropriate FIFO 30 and 32 for transmission onto the bus structure 58.

The asynchronous data pipe 26 is preferably implemented as described in co-pending U.S. patent application Ser. No. 08/612,321, filed on the same date as the present application and entitled "Asynchronous Data Pipe For Automatically Managing Asynchronous Data Transfers Between An Application And A Bus Structure," which is hereby incorporated by reference. The asynchronous data pipe 26 automatically generates transactions necessary to complete asynchronous data transfer operations for an application over a bus structure. The asynchronous data pipe 26 includes a register file 28 which is programmed by the application. The register file 28 allows the application to program requirements and characteristics for the data transfer operation. The register file 28 includes bus speed, transaction label, transaction code, destination node identifier, destination offset address, length of each data packet, packet counter, packet counter bump field, control field and a status field.

After the register file 28 is programmed and initiated by the application, the asynchronous data pipe 26 automatically generates the read or write transactions necessary to complete the data transfer operation over the appropriate range of addresses, using the information in the register file as a template for generating the transactions and headers. The asynchronous data pipe 26 automatically increments the value in the destination offset address field for each transaction according to the length of each data packet, unless an incrementing feature has been disabled, signalling that the transactions are to take place at a single address. The packet counter value represents the number of transactions remaining to be generated. The packet counter value is decremented after each packet of data is transferred. The packet counter bump field allows the application to increment the packet counter value by writing to the packet counter bump field.

Multiple asynchronous data pipes can be included within a link circuit 10 for managing multiple asynchronous data transfer operations. In such a system, each asynchronous data pipe has its own unique transaction label value or range of values. The multiplexer 40 multiplexes the transactions and data packets from the asynchronous data pipes and the isochronous data pipe onto the bus structure 58. The demultiplexer 42 receives signals and data packets from the bus structure 58 and routes them to the appropriate asynchronous data pipe or isochronous data pipe, using the traction code and the transaction label values.

In the link circuit 10 there is only one isochronous data pipe 20. This isochronous data pipe 20 can handle multiple isochronous channels and at the data interface, the isochronous data pipe 20 can interact with more than one application. Therefore, the isochronous data pipe 20 can support more than one stream of isochronous data, where each stream of data is made up of one or more isochronous channels. In an alternative embodiment, as will be described below, the isochronous data pipe 20 can also send and receive asynchronous data, thereby performing the functions of an asynchronous data pipe.

The link core 44 accepts packets of data from the outbound FIFOs 30 and 32, creates packets which comply with the format required by the bus structure 58 and then transfers the packets through the physical interface 56 onto the bus structure 58. The link core 44 transmits one isochronous cycle's worth of data from the outbound isochronous FIFO 30 on each isochronous cycle. When not transmitting isochronous data, the link core 44 transmits asynchronous packets from the outbound asynchronous FIFO 32.

The link core 44 transmits all received packets to the inbound FIFO 34. Unless the link core 44 is operating in a snoop mode, the link core 44 only receives asynchronous packets addressed to the appropriate node ID and isochronous packets with the proper channel numbers. In the snoop mode, the link core 44 receives all packets regardless of their destination node ID or isochronous channel number.

The isochronous data pipe 20 provides a bi-directional data path for application data which is to be transmitted over the bus structure 58. A stream of isochronous data is made up of data on one or more isochronous channels. The isochronous data pipe 20 can operate on any arbitrary stream of isochronous data, containing data on any number of isochronous channels. The isochronous data pipe 20 is a programmable sequencer that operates on a stream of isochronous data from the bus 16 to the outbound isochronous FIFO 30 or from the receive FIFO 34 to the bus 16.

For each quadlet of data transferred, the isochronous data pipe 20 executes a predetermined number of instructions to manipulate the data as necessary. These instructions can operate on the isochronous data block packet. When sending data to be output on the bus structure 58, the stream of data output by the isochronous data pipe 20, is dependent on both the stream of data input to the isochronous data pipe 20 and the manipulations performed on the data by the isochronous data pipe 20. Correspondingly, when receiving data from the bus structure 58, the stream of data output by the isochronous data pipe 20 on the bus 16, is dependent on the stream of data input to the isochronous data pipe 20 and the manipulations performed on the data by the isochronous data pipe 20.

The isochronous data pipe 20 supports several scheduling features for the starting and stopping of isochronous data transfers, depending on the current mode of operation of the isochronous data pipe. With proper programming, the isochronous data pipe supports the isochronous recording data formats, as defined in the SCSI-3 Serial Bus Protocol standard. This protocol defines how to label an isochronous stream of data when it is recorded so that it can be recreated precisely when played back. The isochronous data pipe is a programmable data handling engine in the isochronous data path. With proper programming, this engine implements the isochronous recording formats, plus includes the ability to filter the data by deleting quadlets, or performing specific operations on each quadlet transferred to or from the bus structure 58.

The FIFO interface for both the isochronous data pipe 20 and the asynchronous data pipe 26 is coupled directly to a FIFO 30 and 32, respectively. The FIFO 30 is dedicated to the data path controlled by the isochronous data pipe 20. The FIFO 32 is dedicated to the data path controlled by the asynchronous data pipe 26. The link interface for the isochronous data pipe 20 and the asynchronous data pipe 26 are both coupled through the multiplexer 40 and the demultiplexer 42 to the link core 44. The data presented from the isochronous data pipe 20 and the asynchronous data pipe 26 to the link core 44 is in a format required by the link core function. Both the isochronous data pipe 20 and the asynchronous data pipe 26 expect the data coming from the link core 44 to be in the format defined by the link core specification. If additional logical blocks are included within a system, each logical block is coupled to the link core 44 through the multiplexer 40 and the demultiplexer 42. For example, multiple asynchronous data pipes could be included within a system. In a system with multiple asynchronous data pipes, each of the asynchronous data pipes are coupled to the multiplexer 40 through the FIFO 32. In such a system, an additional multiplexer is included between the asynchronous data pipes and the FIFO 32 for multiplexing packets of data into the FIFO 32.

When directing data from the isochronous data pipe 20, the multiplexer 40 recognizes that when data is available from the isochronous data pipe, the multiplexer 40 transmits one packet of data per isochronous cycle per channel. The data sent from the link core 44 to the isochronous data pipe 20 and the asynchronous data pipe 26 is routed through the FIFO 34 and the demultiplexer 42. The demultiplexer 42 does not change any information when it routes packets from the link core 44 to the appropriate one of the isochronous data pipe 20 or the asynchronous data pipe 26. All information produced by the link core is sent to the destination logical block. The isochronous data pipe 20 and the asynchronous data pipe 26 will perform all necessary manipulation of the data from the link core 44 before this data is transferred to one of the applications 12 and 14, which may include stripping header information required by the protocol for the bus structure 58. For outbound data, the isochronous data pipe 20 and the asynchronous data pipe 26 both prepare data from the application so that it is in the proper form, as required by the link core 44. Both the isochronous data pipe 20 and the asynchronous data pipe 26 will generate the appropriate header information and embed that in the data from the application before sending the data to the link core 44 through the mulipexer 40.

For both the isochronous data pipe 20 and the asynchronous data pipe 26, the link interface produces and consumes data in a format which is compatible with the requirements of the link core 44 function. During a data send operation, the isochronous data pipe 20 will generate the required bus structure specific header information and embed it in the data from the application, as required by the link core 44. During a data receive operation, for data moving from the link core 44 to either the isochronous data pipe 20 or the asynchronous data pipe 26, the isochronous data pipe 20 and the asynchronous data pipe 26 both accept that data in the format provided by the link core 44. In other words, no manipulation of the data is required to translate data from the link core 44 to the isochronous data pipe 20 or the asynchronous data pipe 26.

When only one logical block is included within a system, that logical block can be connected directly to the link core 44. When there are multiple logical blocks within a system, the system includes an appropriate multiplexer 40 and demultiplexer 42 between the logical blocks and the link core 44. The multiplexer 40 is responsible for taking the data at the link interfaces of the multiple logical blocks and multiplexing that data through the link core 44 and onto the bus structure 58 on a packet by packet basis. This information is application specific and is routed to the bus structure in a priority set by the transferring operation. Each isochronous data packet is sent by the multiplexer 40 during its appropriate time period. The demultiplexer 42 uses the value in the transaction code and the channel number fields of each packet received from the bus structure 58 to route the packet to the appropriate logical block 20 or 26. If there is no more than one isochronous data pipe 20 and one asynchronous data pipe 26, then the transaction code is all that is required to route the packet appropriately. The demultiplexer 42 will first read the transaction code to determine that the packet is asynchronous data and should be routed to an asynchronous data pipe. If there is more than one asynchronous data pipe within the system, the demultiplexer 42 then uses the value in the transaction label of the asynchronous response packet header to route the packet to the proper asynchronous data pipe.

The isochronous data pipe of the present invention is a bidirectional data path between a corresponding FIFO and the link core 44. With proper programming, the isochronous data pipe supports the isochronous data recording format, as documented in the SCSI-3 Serial Bus Protocol (SBP) standard and allows programmable manipulation of the data in the isochronous stream.

When transferring data through the corresponding FIFO 30 to the link core 44 or when receiving data from the demultiplexer 42, the isochronous data pipe 20 operates on each quadlet of data independently. The isochronous data pipe 20 performs a programmable number of instructions on each quadlet in order to manipulate the data, as necessary. The possible instructions which can be performed by the isochronous data pipe 20 are included within an instruction set, which will be discussed in detail below. The isochronous data pipe 20 also includes an independent, dedicated register file 24 which will also be discussed in detail below.

If a bus reset occurs while the isochronous data pipe 20 is transferring data, the isochronous data pipe 20 operation resumes exactly where it left off when the next cycle start packet appears on the bus structure 58. Note that although the processing of isochronous data resumes immediately, the embedded application reallocates any channel numbers, bandwidth and any connections in use prior to the bus reset, as defined in the IEEE 1394 standard and the IEC standard for consumer devices.

The isochronous data pipe 20 is controlled by an independent, dedicated register file, as illustrated in FIG. 3. This register file is programmed by the originating application and used to generate headers, instructions and transactions necessary to complete an isochronous data transfer operation across the bus structure 58. The register file 80 includes 120 bytes of data, numbered hexadecimally 0 through 77. In FIG. 3, the register file 80 is illustrated in a table format with 30 horizontal rows, each including four bytes of data. An offset column 82 is included in FIG. 3, to show the offset of the beginning byte in each row from the address of the beginning of the register file 80. A read/write column 84 is also included to show whether the fields in each row can be either read from and written to or read from only.

The cycle time field cycle_time is a twenty bit field within bytes 0–2 of the register file 80. The cycle time field can be read from and written to. When the control event field, which will be discussed below, contains the cycle number value, the cycle time field holds the cycle time on which the isochronous data pipe 20 will start or stop transferring isochronous data.

The control field is a thirty-two bit field within bytes 4–7 of the register file 80. The control field can be read from and written to. The control field includes an event field, an output enable field, a stop on error field, a transmit enable field and a go field. The event field is a four bit field in bits 28–31 of the control register. The value in the event field defines the bus event for the isochronous data pipe 20 to use as a trigger. When this bus event occurs, the isochronous data pipe transfers the value stored in the pending channel mask register pending_ch_mask to the current channel mask register ch_mask. The event field is encoded for the possible bus events as illustrated in Table I below.

TABLE I

| value | meaning |
| --- | --- |
| 0 | immediately |
| 1 | cycle number |
| 2 | reserved |
| 3 | reserved |
| 4-F | reserved |

Therefore, when the event fields a value equal to 0, the isochronous data pipe will then start or stop immediately. When the event field holds a value equal to 1, the isochronous data pipe will then start or stop, as specified by the value in the cycle time field, as discussed above.

The output enable field is a four bit field in bits 4–7 of the control field. When any of the bits in the output enable field are set to a logical high voltage level, then the corresponding DMA channel will assure that the prefill FIFO is kept full and the isochronous data pipe 20 will dispatch to the control store output instruction whenever there is an empty quadlet in the output FIFO 30.

The stop on error field is one bit field in bit 3 of the control field. When the stop on error bit is set to a logical high voltage level, the isochronous data pipe 20 will stop the current operation on the first error encountered by setting the value in the channel mask register to a logical low voltage level. Possible errors when sending data include a FIFO underrun or a missing cycle start packet. Possible errors when receiving data include a FIFO overrun, a missing cycle start packet, a data CRC error, an error in packet format or a channel missing error.

The transmit enable field is a one bit field in bit 1 of the control field. When the transmit enable bit is set to a logical high voltage level, the isochronous data pipe 20 will begin executing the output control store program. When the go bit is at a logical low voltage level or the output control store program executes a return instruction, the transmit enable bit will be cleared.

The go field is a one bit field in bit 0 of the control field. The application sets the go bit to a logical high voltage level to enable the isochronous data pipe to watch for an event. When the specified event condition is satisfied, the isochronous data pipe 20 transfers the contents of the pending channel mask register to the current channel mask register.

The status field is a thirty-two bit field within bytes 8-B of the register file 80. The status field can be read from and written to. The status field contains status information which reports the current state of the isochronous data pipe 20. The bits 0–7 of the status field correspond to the bits 0–7 of the control field and include an output field, a stop on error field, a transmit enable field and an active field. The value of these fields in the status register indicate the current operational state of the isochronous data pipe 20. The bits 8–27 of the status field are reserved. Within the status field, the active field is a one bit field in bit 0 of the status field, which indicates whether or not the isochronous data pipe is active. Preferably, if the active bit is equal to a logical high voltage level, the isochronous data pipe is currently active and transferring data. If the active bit is equal to a logical low voltage level, the isochronous data pipe is not currently active. The error field is a four bit field in bits 28–31 of the status field. When the isochronous data pipe 20 halts operation due to an error, the error field contains a value indicating the error condition. The error field is only valid when the active bit is equal to a logical low voltage level. The possible values for the error field and the error to which they correspond are listed in Table II below.

TABLE II

| Value | Error |
|---|---|
| 0 | FIFO overrun |
| 1 | FIFO underrun |
| 2 | Missing cycle start packet |
| 3 | Data CRC error |
| 4 | Missing cycle start packet |
| 5 | Error in packet, format |

The pending channel mask high field pending ch__mask__hi is a four byte field within bytes 20–30 of the register file 80. The pending channel mask low field pending ch__mask__lo is a four byte field within bytes 24–27 of the register file 80. Together, the two pending channel mask fields pending__mask__hi and pending__ch mask__lo form an eight byte field containing the mask of isochronous channel numbers for the isochronous data pipe 20 to receive. The isochronous data pipe 20 transfers the contents of this field to the channel mask register when the programmed trigger event occurs. The bit assignment of the pending channel mask field is the same as the bit assignment of the channels available register defined in chapter eight of the IEEE 1394 standard.

The current channel mask high field ch__mask__hi is a four byte field within bytes 28–2B of the register file 80. The current channel mask low field ch__mask__lo is a four byte field within bytes 2C–2F of the register file 80. Together, the two current channel mask fields ch__mask__hi and ch__mask__lo form an eight byte field containing the channel mask currently in operation, with each bit within the current channel mask fields representing an isochronous channel. The channel mask field is only loaded from the pending channel mask field when a trigger event occurs. The isochronous data pipe 20 ignores received isochronous channel numbers for which the corresponding bit in the current channel mask field is set to a logical high voltage level.

The control store output field CS__output is a one byte field within byte 34 of the register file 80. The control store output field CS__output contains the control store address within the control store memory, to which the isochronous data pipe 20 dispatches whenever there is an empty quadlet in the outbound FIFO 30 and the isochronous data pipe 20 is not currently receiving an isochronous packet of data. The control store memory contains instructions used by the isochronous data pipe in performing its operations on a stream of data.

The control store cycle start address field CS__addr__CS is a one byte field within byte 37 of the register file 80. The control store address field CS__addr__CS contains the control store address to which the isochronous data pipe branches when the cycle start packet is received. The first quadlet available to the control store program is the first quadlet of the cycle start packet. The control store address fields CS__addr__$_0$ through CS__addr__63 are each one byte fields within bytes 38 through 77 of the register file 80. These fields contain the control store address store where the isochronous data pipe is to branch upon receiving data on the isochronous channel matching the byte number of the control store address field. For example, the control store address field CS__addr__10 contains the address in the control store where the isochronous data pipe is to branch upon receiving data on the isochronous channel number 10. The isochronous data pipe ignores all isochronous channels for which the corresponding value in the control store address field is equal to FFh. It should be noted that the behavior of the control store address field is the same when transmitting as when receiving isochronous data.

There are sixty-four potential isochronous channels 0–63. The control store address fields CS__addr__0 through CS__addr__63 each correspond to an isochronous channel and contain the address in the control store memory where the instructions for that isochronous channel begin. Accordingly, when the isochronous data pipe 20 receives data on a particular isochronous channel, the isochronous data pipe 20 branches to the address contained in the corresponding control store address field to obtain the instructions for manipulating the data for that channel. Isochronous channels for which the corresponding value in the control store address field is equal to FFh are ignored.

A stream of isochronous data is made up of one or more isochronous channels. The isochronous data pipe 20 receives isochronous channels for which the corresponding bit in the current channel mask field is set to a logical high voltage level. The isochronous data pipe 20 transmits isochronous data according to the control store program beginning at the control store address pointed to by the value in the control store output CS__output register. For example, if the isochronous channels 3, 4 and 5 exist on the bus structure 58 and the application wants the isochronous data pipe 20 to combine channels 3 and 5 into a single stream without performing any manipulation on the data contained in these isochronous channels, then the application programs a value of "10h," for example, into the control store address fields CS__addr__3 and CS__addr__5. At the control store address "10h," the application then loads an instruction sequence as shown in Table III.

TABLE III

|  | SHIFTI | BUS_IN, 16, D0 | ;Shift to get the data length value |
|---|---|---|---|
|  | ADDI | D0, 3, D0 | ;Wrap up |
|  | ANDI | D0, FFFC, D0 | ;and mask to get count plus pad |
|  | BZ | HALT | ;Done if data length equals zero |
| CONT: | MOVE | BUS_IN, DATA_0 | ;Move a data word to DMA channel 0 |
|  | SUBI | D0, 4, D0 | ;Decrement byte count |
|  | BNZ | CONT | ;Continue if not zero |
| HALT: | RET |  | ;Finished with this packet |

The application then programs a value of "28h" into the pending channel mask, then writes a value of "1" into the control field. This value in the control field indicates an event of immediate with no DMA channels programmed for output. The result is that the isochronous data pipe 20 immediately shifts the value of the pending channel mask field into the current channel mask field. Because the bits 3 and 5 are now set to a logical high voltage level in the current channel mask field, the isochronous data pipe 20 will begin processing the isochronous channels 3 and 5 according to the control store program beginning at address "10h." Note that in this example both the control store fields CS_addr_3 and CS addr_5 contain a value of "10h," so that the data for both of the isochronous channels 3 and 5 is processed according to the same control store instruction sequence, beginning at the address "10h."

The control store program illustrated in Table III is a program which moves the data from the receive FIFO 34 onto the DMA channel 0 on the bus 16. The isochronous data pipe 20 ignores any data received on isochronous channel 4 because the bit 4 in the current channel mask field is not set to a logical high voltage level.

In the last line of the control store program illustrated in Table III, a return instruction is included. In all cases, the return instruction causes the isochronous data pipe 20 to perform the same tasks; namely, the isochronous data pipe decrements the value of the stack pointer and dispatches to the instruction within the stack which the stack pointer is currently pointing to. If the stack pointer is equal to zero when a return instruction is executed, the isochronous data pipe 20 halts operation until the next enabled isochronous channel is received or a cycle start packet is received. If the isochronous data pipe 20 is executing an output control store program, a return instruction will cause the isochronous data pipe to resume operation at the instruction where the output program was interrupted by the received isochronous packet.

The isochronous data pipe is actually a programmable sequencer which can be programmed to perform operations on the received stream of isochronous data. The isochronous data pipe sequencer contains a register file as illustrated in FIG. 4. Within the register file 90, the immediate value register IMM is a thirty-four bit register with a register code of "0" which can only be a source register. The immediate value register IMM specifies that the thirty-four bit immediate field of the instruction contains the source data for the given operation.

The bus input register BUS_IN is a thirty-two bit register with a register code of "1" which can only be a source register. Accessing the bus input register BUS_IN as a source of an operation clocks one quadlet of data from the receive FIFO 34 through the isochronous data pipe 20. Subsequent accesses to the bus input register BUS_IN access subsequent quadlets of data in the input data stream.

The bus output register BUS_OUT is a thirty-four bit register with a register code of "2" which can only be a destination register. Accessing the bus output register BUS_OUT as a destination of an operation clocks one quadlet of data through the isochronous data pipe 20 to the outbound isochronous FIFO 30. Subsequent accesses to the bus output register BUS_OUT clock subsequent quadlets of data in the output data stream.

The data registers D0–D7 are each thirty-four bit registers with a register code of "4", "5", "6", "7", "8", "9", "A" and "B", respectively, which can be either a source or destination register. The data registers D0–D7 can be used as the source or destination register for any operation.

The data interface registers DATA_0-DATA_3 are each thirty-two bit registers with a of "10", "11", "12" and "13", respectively, which can be either a source or destination register. Each of the data interface registers DATA_0-DATA_3 access a different DMA channel. Use of these registers is to be consistent with the programming of the output enable field DMA_out_en.

The isochronous data pipe 20 implements a stack made up of a linear list of eight one byte registers. The stack registers are only accessed during a branch to subroutine instruction and a return instruction. In the preferred embodiment of the present invention, the stack registers S0–S7, each have a respective register address 0–7. Alternatively, the actual number of stack registers will vary depending on the specific implementation. When the control store program is loaded, the stack pointer is automatically initialized to a value of zero, thereby pointing to the corresponding stack register S0.

When the isochronous data pipe 20 branches to a subroutine, the isochronous data pipe 20 decrements the stack pointer, stores the address of the next control store instruction into the current stack register, increments the value of the stack pointer, then branches to the control store instruction contained in the low order byte of the source field. When the isochronous data pipe 20 executes a return instruction, it decrements the stack pointer, then the isochronous data pipe 20 branches to the control store instruction contained in the current stack register. If the stack pointer is decremented when it contains a value equal to zero, the value of the stack pointer will remain at zero and the isochronous data pipe 20 will halt operation until it receives an isochronous data packet or cycle start packet. When the isochronous data pipe is executing an output control store program and a cycle start packet or enabled isochronous channel is received, the isochronous data pipe 20 will interrupt execution of the output control store program, save the address of the current instruction in the stack, decrement the stack pointer and then dispatch to the proper location to handle the received packet.

Each isochronous control store instruction includes an OpCode field, a source field, a destination field, an immediate value field, an immediate field and a reserved field. The OpCode field is a six bit field which describes an operation to perform, as will be discussed below in reference to FIG. 5. The source field src is a four bit field which specifies a register or immediate value which contains the source value for the specified operation. The destination field dest is a four bit field which specifies a destination register for the specified operation. The immediate value field imm_val is a one bit field which when set to a logical high voltage level, specifies that one of the operands is contained in the immediate field. The immediate field imm is a thirty-four bit field which specifies an immediate value to use for an operation if the immediate value field imm_val is set to a logical high voltage level. In the preferred embodiment of the present invention, the reserved field includes thirteen bits which are reserved for use in alternate embodiments of the isochronous data pipe 20.

The operation codes which are implemented by the isochronous data pipe sequencer during manipulation of a data stream and can be included in the OpCode field are listed in Table IV below. The isochronous data pipe 20 will store the results for any of these operations into any register which is capable of being a destination, as illustrated in FIG. 4, including the data registers D0–D7, the outbound isochronous FIFO 30 and any DMA channel which is configured as a destination.

TABLE IV

| Name | Mnemonic | Value (HEX) | Function |
|---|---|---|---|
| MOVE | MOVE MOVEI | 0 | moves value in src register to dest register |
| MOVE Multiple | MOVEM | 1 | moves a block of quadlets between the source and destination (i.e., between a DMA register and the outbound FIFO) |
| | | 2 | |
| | | 3 | |
| AND | AND ANDI | 4 | ANDs the value in the src register to the immediate value or the value in the dest register, and stores the result into the dest register |
| OR | OR ORI | 5 | ORs the value in the src register to the immediate value or the value in the dest register, and stores the result into the dest register |
| SHIFT | SHIFT SHIFTI | 6 | SHIFTS the value in the src register by the immediate value or the value in the dest register and stores the result into the dest register; positive values cause the isochronous data pipe to shift right; the isochronous data pipe fills the input bits with zeros |
| COMPARE | CMP CMPI | 7 | subtracts the immediate value from the value in the src register, or subtracts the value in the src register from the value in the dest register, but does not store the result; sets the Z bit according to the result of the subtraction |
| ADD | ADD ADDI | 8 | Adds value in src register to the immediate value or the value in dest register and stores the result in the dest register |
| SUBTRACT | SUB SUBI | 9 | Subtracts the immediate value from the value in the src register, or subtracts the value in the src register from the value in the dest register and stores the result in the dest register |
| MULTIPLY | MULT MULTI | A | Multiplies the immediate value by the value in the src register, or multiples the value in the src register by the value in the dest register and stores the result in the dest register |
| | | B | |
| | | C | |
| | | D | |
| | | E | |
| | | F | |
| BRANCH | BRA | 10 | Branch to the control store address contained in the imm field |
| BRANCH ON ZERO | BZ | 11 | Branch to the control store address contained in the imm field if the result of the dest field from the previous operation was equal to zero |
| BRANCH ON NOT ZERO | BNZ | 12 | Branch to the control store address contained in the imm field if the result of the dest field from the previous operation was not equal to zero |
| | | 13 | |
| BRANCH TO SUB | BSR | 14 | Decrement the stack pointer, save the address of the following instruction on the stack and branch to the CS address contained in the imm field |
| BRANCH TO SUB ON ZERO | BSRZ | 15 | If the result of the dest field from the previous operation was equal to zero, then decrement the stack pointer, save the address of the following instruction on the stack and branch to the CS address contained in the immediate field |
| BRANCH TO SUB ON NOT ZERO | BSRNZ | 16 | If the result of the dest field from the previous operation was not equal to zero, then decrement the stack pointer, save the address of the following instruction on the stack and branch to the CS address contained in the imm field |
| | | 17 | |
| RETURN | RET | 18 | Branch to the instruction at the address contained on the stack; increment the stack pointer |

For most of the operations listed in Table IV, there are included two mnemonic instructions. The mnemonic instruction which includes an "I" specifies the operation is to be conducted using the immediate value. The mnemonic instruction which does not include an "I" specifies the operation is to be conducted between the values in the source and destination registers.

When a MOVE operation is performed, the value in the register specified in the source field src is moved to the register specified in the destination field dest. If the register specified in the source field src is a thirty-four bit register and the register specified in the destination field dest is a thirty-two bit register, the high order two bits will be lost. If the register specified in the source field src is a thirty-two bit register and the register specified in the destination field dest is a thirty-four bit register, then the high order two bits will both be set to a logical low voltage level.

When a MOVE Multiple operation is performed, a number of quadlets of data specified by a count value are moved from the register specified in the source field src to the register specified in the destination field dest. The count value is stored in the register designated in the immediate field of the instruction. Preferably, for the MOVE Multiple operation, the register specified in the source field src is one of the data interface registers DATA_0-DATA_3, which access a DMA channel, or the bus input register BUS_IN. Preferably, for this operation, the register specified in the destination field dest is one of the data interface registers DATA_0-DATA_3, which access a DMA channel, or the bus output register BUS_OUT.

During an AND operation, a logical AND operation is performed on the values in the source field src and the destination field dest and the result is stored in the register specified in the destination field dest. The ANDI form of this instruction uses the value in the immediate field instead of the value in the destination field as one of the operands and stores the result in the register specified in the destination field dest. If the register specified in the source field src is a thirty-four bit register and the register specified in the destination field dest is a thirty-two bit register, the high order two bits will be lost. If the register specified in the source field src is a thirty-two bit register and the register specified in the destination field dest is a thirty-four bit register, then the high order two bits will both be set to a logical low voltage level. If both the register specified in the source field src and the register specified in the destination field dest are thirty-four bit registers, then the AND operation is performed on all thirty-four bits.

During an OR operation, a logical OR operation is performed on the values in the registers specified by the source field src and the destination field dest and the result is stored in the register specified in the destination field dest. The ORI form of this instruction uses the value in the immediate field instead of the value in the destination field as one of the operands and stores the result in the register specified in the destination field dest. If the register specified in the source field src is a thirty-four bit register and the register specified in the destination field dest is a thirty-two bit register, the high order two bits will be lost. If the register specified in the source field src is a thirty-two bit register and the register specified in the destination field dest is a thirty-four bit register, then the high order two bits will both be set to a logical low voltage level. If both the register specified in the source field src and the register specified in the destination field dest are thirty-four bit registers, then the OR operation is performed on all thirty-four bits.

When a SHIFT operation is performed, the value in the destination register dest is shifted by the number of bits specified by the value in the source register src and the result is stored in the register specified in the destination field dest. A positive shift value shifts the value in the destination register to the right towards the least significant bit and zeros are used to fill in the shifted bits on the left beginning with the most significant bit. A negative shift value shifts the value in the destination register to the left towards the most significant bit and zeros are used to fill in the shifted bits on the right beginning with the least significant bit. The SHIFTI form of this instruction shifts the value in the source register by the number of bits specified in the immediate field and stores the result in the register specified in the destination field. If the register specified in the source field src is a thirty-four bit register and the register specified in the destination field dest is a thirty-two bit register, the high order two bits will be lost. If the register specified in the source field src is a thirty-two bit register and the register specified in the destination field dest is a thirty-four bit register, then the high order two bits will both be set to a logical low voltage level. If both the register specified in the source field src and the register specified in the destination field dest are thirty-four bit registers, then the shift operation is performed on only the low order thirty-two bits.

When a CMP operation is performed, the value in the source register src is subtracted from the value in the destination register dest. If the result of the CMP operation is a positive value, the Z bit is set to a logical high voltage level. If the result of the CMP operation is a negative or zero value, the Z bit is set to a logical low voltage level. The results of the CMP operation are not stored anywhere. The CMPI form of this instruction subtracts the immediate value from the value in the source register src, and sets the Z bit as specified above, according to the result. This instruction also does not store the result of the operation.

When an ADD operation is performed, the value in the source register src is added to the value in the destination register dest and the result is stored in the destination register dest. The ADDI form of this instruction adds the value in the source register src to the immediate value and stores the result in the destination register dest. If the register specified in the source field src is a thirty-four bit register and the register specified in the destination field dest is a thirty-two bit register, the high order two bits will be lost. If the register specified in the source field src is a thirty-two bit register and the register specified in the destination field dest is a thirty-four bit register, then the high order two bits will both be set to a logical low voltage level. If both the register specified in the source field src and the register specified in the destination field dest are thirty-four bit registers, then the ADD operation is performed on only the low order thirty-two bits.

When a SUB operation is performed, the value in the destination register dest is subtracted from the value in the source register src and the result is stored in the destination register dest. The SUBI form of this instruction subtracts the immediate value from the value in the source register and the result is stored in the destination register dest. If the register specified in the source field src is a thirty-four bit register and the register specified in the destination field dest is a thirty-two bit register, the high order two bits will be lost. If the register specified in the source field src is a thirty-two bit register and the register specified in the destination field dest is a thirty-four bit register, then the high order two bits will both be set to a logical low voltage level. If both the register specified in the source field src and the register specified in the destination field dest are thirty-four bit registers, then the SUB operation is performed on only the low order thirty-two bits.

When a MULT operation is performed, the value in the source register src is multiplied by the value in the destination register dest and the result is stored in the destination register dest. The MULTI form of this instruction multiplies the immediate value by the value in the source register src and the result is stored in the destination register dest. If the register specified in the source field src is a thirty-four bit register and the register specified in the destination field dest is a thirty-two bit register, the high order two bits will be lost. If the register specified in the source field src is a thirty-two bit register and the register specified in the destination field dest is a thirty-four bit register, then the high order two bits will both be set to a logical low voltage level. If both the register specified in the source field src and the register specified in the destination field dest are thirty-four bit registers, then the MULT operation is performed on only the low order thirty-two bits.

When a BRANCH operation is performed, the isochronous data pipe 20 branches to the control store address contained in the low order byte of the source field src. The source field src can specify a register or an immediate value.

When a BRANCH ON ZERO operation is performed, the isochronous data pipe 20 branches to the control store address contained in the low order byte of the source field src if the result of the last arithmetic or move control store instruction was equal to zero. The source field src can specify a register or an immediate value.

When a BRANCH ON NOT ZERO operation is performed, the isochronous data pipe 20 branches to the control store address contained in the low order byte of the source field src if the result of the last arithmetic or move control store instruction was not equal to zero. The source field can specify a register or an immediate value.

When a BSR operation is performed, the address of the next control store instruction is pushed onto the stack and the isochronous data pipe 20 branches to the control store address contained in the low order byte of the source field src. The source field src can specify a register or an immediate value.

When a BSR ON ZERO operation is performed, if the result of the last arithmetic or move control store instruction was equal to zero, the address of the next control store instruction is pushed onto the stack and the isochronous data pipe 20 branches to the control store address contained in the low order byte of the source field src. The source field src can specify a register or an immediate value.

When a BSR ON NOT ZERO operation is performed, if the result of the last arithmetic or move control store instruction was not equal to zero, the address of the next control store instruction is pushed onto the stack and the isochronous data pipe 20 branches to the control store address contained in the low order byte of the source field src. The source field src can specify a register or an immediate value.

When a RETURN operation is performed, the last control store address is popped off of the stack and the isochronous data pipe 20 branches to that address.

The isochronous recording format defined in the Serial Bus Protocol defines a standard format for recording a stream of isochronous data as transmitted over the bus structure 58. The isochronous data pipe 20 of the present invention can be programmed to transform a received stream of isochronous data into the isochronous recording format, according to the Serial Bus Protocol. Correspondingly, the isochronous data pipe can also be programmed to create a stream of isochronous data from a stream of data in the isochronous recording format. A stream of data in the isochronous recording format is illustrated in FIG. 5. It should be noted that the data stream illustrated in FIG. 5 begins on an isochronous cycle boundary.

In FIG. 5, the data stream 94 includes data packets which are included for each isochronous cycle in both channels A and B. An offset column 92 is included in FIG. 5, to show the offset of the beginning of each horizontal row. The header horizontal rows each include four bytes. The data section will include as many bytes as necessary to transfer the data packet. The header for each packet includes a seconds field, a cycle number field, and a cycle field. Each subheader for each channel within each packet includes a data_length field, a tag field tg, a channel field, a data field and a synchronizing field sy. The subheader is then followed by the data section within the packet.

EXAMPLE

Converting Isochronous Data To The Isochronous Recording Format

The control store program included in Table V below illustrates an example of how the isochronous data pipe 20 of the present invention can be programmed by an application to capture an isochronous stream of data consisting of channels 3 and 5, map channel 3 to channel 7 and channel 5 to channel 9 and then send the resulting stream of data to DMA channel 0 in the isochronous recording format.

TABLE V

| CS_addr_CS: | ANDI | BUS_In, 0XFFFFF000, D3 | ;mask cycle start packet |
|---|---|---|---|
| | ORI | D3, 0Xcycle0, DATA_0 | ;Send it to DMA ch 0 |
| | RET | | ;finished |
| CS_addr_5: | BSR | GET_QUAD | ;Get the isoch header |
| | ORI | D2, 0X900, DATA_0 | ;Map to channel 9 and output |
| | BRA | GET_DATA | ;branch to get data field |
| CS_addr_3: | BSR | GET_QUAD | ;Get the isoch header |
| | ORI | D2, 0X700, DATA_0 | ;Map to channel 7 and output |
| GET_DATA: | SHIFTI | D2, 16, D2 | ;Get the data length |
| | ADDI | D2, 3, D2 | ;Wrap it up |
| | ANDI | D2, FFFC, D2 | ;and mask |
| | BZ | HALT | ;Finished if zero |
| MOVE_DATA: | MOVE | BUS_IN, DATA_0 | ;Get the next quadlet |
| | SUBI | D2, 4, D2 | ;Decrement quadlet counter |
| | BNZ | MOVE_DATA | ;Continue if not zero |
| HALT: | RET | | ;Else, we're done |
| GET_QUAD: | ANDI | BUS_IN, 0XFFFFC00F, D2 | ;Get the hdr w/o ch or tcode |
| | ORI | D2, 0Xdata0, D2 | ;Set the data marker |
| | RET | | ;And return |

EXAMPLE

Converting From Isochronous Recording Format

The control store program included in Table VI below illustrates an example of how the isochronous data pipe 20 of the present invention can be programmed by an application to take a stream of data at DMA channel 3 which is in the isochronous recording format and create a stream of isochronous data for transmission over the bus structure 58. The source stream of data contains isochronous channels 7 and 9. This control store program maps channel 7 to channel 1 and channel 9 to channel 2. Note that the program illustrated in Table VI requires that the first quadlet of data presented at DMA channel is a cycle start quadlet.

TABLE VI

| | | | |
|---|---|---|---|
| CS_output: | MOVE | DATA_3, D0 | ;Get a quadlet |
| | MOVEI | 0x100000000, D3 | ;Prepare the output register |
| TEST_TYPE: | ANDI | D0, 0XF0, D1 | ;Test the op code |
| | CMPI | D1, 0Xdata0 | ;Is this a packet? |
| | BZ | CONT_HDR | ;Continue processing if so |
| | MOVEI | 0X300000000, D3 | ;Else set the cycle start flag |
| | MOVE | DATA_3, D0 | ;And get the next quadlet |
| | BRA | TEST_TYPE | ;Then test this one also |
| CONT_HDR: | ANDI | D0, 0X3F00, D1 | ;get the ch number |
| | ANDI | D0, 0XFFFFC00F, D3 | ;Clear tcode and ch fields |
| | ORI | D0, 0X'isoch'0, D3 | ;restore tcode |
| | CMPI | D1, 0X700 | ;Is this channel 7? |
| | BZ | CH_7 | ;Branch to handle if so |
| | CMPI | D1, 0X900 | ;is this channel9? |
| | BNZ | DISCARD | ;discard if not |
| | ORI | D3, 0X200, BUS_OUT | ;Else this is ch 9 |
| | BRA | CONT_DATA | ;Then continue with data field |
| CH_7: | ORI | D3, 0X100, BUS_OUT | ;map to channel 1 |
| CONT_DATA: | BSR | GET_COUNT | ;Get quadlet count |
| CONT_OUT: | BZ | CS_output | ;continue if not |
| | MOVE | DATA_3, BUS_OUT | ;send something out |
| | SUBI | D3, 4, D3 | ;decrement quadlet counter |
| | BRA | CONT_OUT | ;and continue outputting |
| DISCARD: | BSR | GET_COUNT | ;Get quadlet count |
| CONT_DIS: | BZ | CS_output | ;Continue if not |
| | MOVE | DATA_3, D0 | ;Else, get a quadlet |
| | SUBI | D3, 4, D3 | ;Decrement quadlet counter |
| | BRA | CONT_DIS | ;Continue to discard |
| GET_COUNT: | SHIFTI | D3, 16, D3 | ;Get the data length |
| | ADDI | D3, 3, D3 | ;Wrap it up |
| | ANDI | D3, FFFC, D3 | ;And mask |
| | RET | | ;then return |

Formats for carrying digital consumer audio and video data over an IEEE 1394 format bus via an isochronous channel contain absolute time stamps which are inserted by the sender and used at the receiver to recreate the timing information necessary to decode the stream of data. Similarly, non-consumer audio and video storage devices, such as a hard disk drive, will also modify this embedded time stamp information such that when the data is played back at a later time, a consumer device receiving the data will function properly.

The isochronous data pipe 20 is first initialized by an application before it can transfer isochronous data. Once initialized, the application uses the control register to change the operational state of the isochronous data pipe 20. The current operational state is completely defined by the value in the current channel mask register and the information contained in the low order byte of the status register.

In order to change the state of the isochronous data pipe 20, the application programs a new channel mask value into the pending channel mask register and a new operational state into the control register. In the same register access to the control register, the application also sets the go bit and programs an event into the event field. When the programmed event occurs, the isochronous data pipe 20 transfers the value in the pending channel mask register to the current channel mask register. The isochronous data pipe 20 also transfers the information in the low order byte of the control register into the low order byte of the status register.

In order to stop the operation of the isochronous data pipe 20, the application programs a value of one into the pending channel mask register and a logical low voltage level into the transmit enable bit in the control register. As with any state change, the application also sets the go bit and programs an event into the event field of the control register. When the event occurs the value in the current channel mask register becomes zero and the transmit enable bit in the status register is pulled to a logical low voltage level, thereby stopping the operation of the isochronous data pipe 20. When the operation of the isochronous data pipe 20 is stopped, the active bit in the status register is also pulled to a logical low voltage level.

In order to activate the isochronous data pipe 20, the application first loads a control store program and programs the proper control store offsets into the control store address register file. The pending channel mask register is then programmed with a bit mask of the channels which the isochronous data pipe 20 is to receive. If the isochronous data pipe 20 is not receiving data, the value in the pending channel mask register is programmed to zero. The go bit in the control register is set to a logical high voltage level to indicate a state change. The transmit enable bit in the control register is set to a logical high voltage level if the isochronous data pipe 20 is transmitting isochronous data. The stop on error bit in the control register is set to a logical high voltage level if the isochronous data pipe 20 is to stop operation on any error. If the isochronous data pipe 20 is transmitting isochronous data, the output enable bits in the control register which correspond to the DMA channels involved in transmitting isochronous data are set to a logical high voltage level. The event field in the control register is programmed to an event on which the isochronous data pipe 20 is to change state.

The asynchronous data pipe 26, as stated above, automatically generates transactions necessary to complete asynchronous data transfer operations for an application over the bus structure 58. In an alternate embodiment of the isochronous data pipe 20 of the present invention, the isochronous data pipe 20 can be programmed to transfer and receive both isochronous and asynchronous data. Accordingly, in this embodiment, the asynchronous data pipe 26 and the corresponding FIFO 32 are not necessary. Furthermore, because the isochronous data pipe 20 is the only logical block within the link circuit, the multiplexer 40 and demultiplexer 42 are also not necessary.

As described above, the isochronous data pipe 20 of the preferred embodiment is programmed to execute a control store program and perform a series of operations on a stream of isochronous data. In this alternate embodiment, the isochronous data pipe 20 also can be programmed to send and receive asynchronous data. In this embodiment, the isochronous data pipe 20 appears as a virtual asynchronous data pipe and is programmed to generate the transactions necessary to complete asynchronous data transfer operations, as well as generate the appropriate headers when sending data and strip headers from received data, as described in U.S. patent application Ser. No. 08/612,321, filed on the same date as the present application and entitled "Asynchronous Data Pipe For Automatically Managing Asynchronous Data Transfers Between An Application And A Bus Structure."

In this alternate embodiment, the isochronous data pipe 20 will send or receive both isochronous and asynchronous data. The isochronous data pipe 20 is programmed by an application to execute an appropriate program for manipulating either an isochronous or asynchronous stream of data, as necessary. When receiving or transmitting asynchronous data the isochronous data pipe 20 is programmed to automatically generate the read or write transactions necessary to complete the data transfer operation over the appropriate range of addresses. The isochronous data pipe will appropriately automatically increment the value in the destination offset address field for each transaction according to the length of each data packet, unless an incrementing feature has been disabled, signalling that the transactions are to take place at a single address.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention.

We claim:

1. A method of controlling streams of data between an application and a bus structure comprising:
   a. receiving a stream of data from a source selected from the application and the bus structure thereby forming a received stream of data;
   b. obtaining a series of at least one operation codes regarding the received stream of data; and
   c. generating an output stream of data by converting the received stream of data into the output stream of data by executing the series of operation codes.

2. The method as claimed in claim 1 wherein the received stream of data is an isochronous stream of data.

3. The method as claimed in claim 1 wherein the received stream of data is one of an isochronous stream of data and an asynchronous stream of data.

4. The method as claimed in claim 2 further comprising determining a channel number for the received stream of data, wherein the series of operation codes is obtained from a memory address corresponding to the channel number of the received isochronous stream of data.

5. The method as claimed in claim 3 further comprising determining if the received stream of data is an isochronous stream of data or an asynchronous stream of data.

6. The method as claimed in claim 4 wherein the bus structure is an IEEE 1394 standard bus structure.

7. The method as claimed in claim 5 wherein the series of operation codes is obtained from a memory address corresponding to the channel number if the received stream of data is an isochronous stream of data and from a memory address corresponding to asynchronous data if the received stream of data is asynchronous stream of data.

8. The method as claimed in claim 7 wherein the bus structure is an IEEE 1394 standard bus structure.

9. An apparatus for controlling bidirectional streams of data between an application and a bus structure comprising:
   a. means for receiving a stream of data from a source selected from the application and the bus structure and forming a received stream of data;
   b. means for obtaining a series of at least one operation codes regarding the received stream of data; and
   c. means for generating an output stream of data coupled to the means for obtaining for converting the received stream of data into the output stream of data by executing the series of operation codes.

10. The apparatus as claimed in claim 9 wherein if the received stream of data is received from the application, the output stream of data is provided to the bus structure, and if the received stream of data is received from the bus structure, the output stream of data is provided to the application.

11. The apparatus as claimed in claim 9 further comprising a memory coupled to the means for obtaining and configured for coupling to the application for storing the series of operation codes.

12. The apparatus as claimed in claim 11 wherein the received stream of data is an isochronous stream of data.

13. The apparatus as claimed in claim 11 further comprising means for determining coupled to the means for receiving for determining if the received stream of data is an isochronous stream of data or an asynchronous stream of data.

14. The apparatus as claimed in claim 12 wherein the series of operation codes stored at a memory address corresponding to a channel number on which the received stream of data is transmitted.

15. The apparatus as claimed in claim 14 wherein the bus structure is an IEEE 1394 standard bus structure.

16. The apparatus as claimed in claim 13 wherein the series of operation codes is stored at a memory address corresponding to a channel number on which the received stream of data is transmitted if the received stream of data is an isochronous stream of data and at a memory address corresponding to asynchronous data if the received stream of data is an asynchronous stream of data.

17. The apparatus as claimed in claim 16 wherein the bus structure is an IEEE 1394 standard bus structure.

* * * * *